United States Patent [19]

Tratz et al.

[11] 4,445,325
[45] May 1, 1984

[54] INSTALLATION FOR GENERATING SUPERHEATED PROCESS STEAM FROM SALT-CONTAINING RAW WATER

[75] Inventors: Herbert Tratz, Ottensoos; Hermann Finckh, Nuremberg; Konrad Künstle, Röttenbach, all of Fed. Rep. of Germany

[73] Assignee: Kraftwerk Union Aktiengesellschaft, Mülheim An der Ruhr, Fed. Rep. of Germany

[21] Appl. No.: 526,213

[22] Filed: Aug. 24, 1983

Related U.S. Application Data

[63] Continuation of Ser. No. 265,627, May 20, 1981.

[30] Foreign Application Priority Data

May 28, 1980 [DE] Fed. Rep. of Germany ....... 3020297

[51] Int. Cl.³ .......................... F02G 1/02; F01K 17/00
[52] U.S. Cl. .................................. 60/39.182; 60/648; 122/451 S; 203/DIG. 20
[58] Field of Search ................ 60/39.18 B, 39.07, 648; 122/40, 41, 451 R, 451 S, 452; 203/88, 100, DIG. 8, DIG. 20

[56] References Cited

U.S. PATENT DOCUMENTS

| 2,970,434 | 2/1961 | Warren | 60/39.18 B |
| 3,489,652 | 1/1970 | Wiliamson | 60/648 X |
| 3,649,469 | 3/1972 | MacBeth | 203/DIG. 16 |
| 4,094,747 | 6/1978 | Pfenninger | 203/DIG. 20 |

FOREIGN PATENT DOCUMENTS 2243380 3/1974 Fed. Rep. of Germany .

OTHER PUBLICATIONS

German Article "Zwangumlaufkessel Bauart Conte" from the Magazine Die Warme, Berlin, Dec. 4, 1937.

*Primary Examiner*—Louis J. Casaregola
*Assistant Examiner*—Timothy S. Thorpe
*Attorney, Agent, or Firm*—Herbert L. Lerner; Laurence A. Greenberg

[57] ABSTRACT

Installation for generating superheated steam from raw water containing salt using preheaters for heating the raw water. The last preheater, as seen in the flow direction of the raw water, is followed via a control valve by a decompression cylinder. Part of the raw water evaporates and the vapor is withdrawn from the dome of the decomposition cylinder by a compressor which compresses and heats it and discharges it as superheated steam.

4 Claims, 1 Drawing Figure

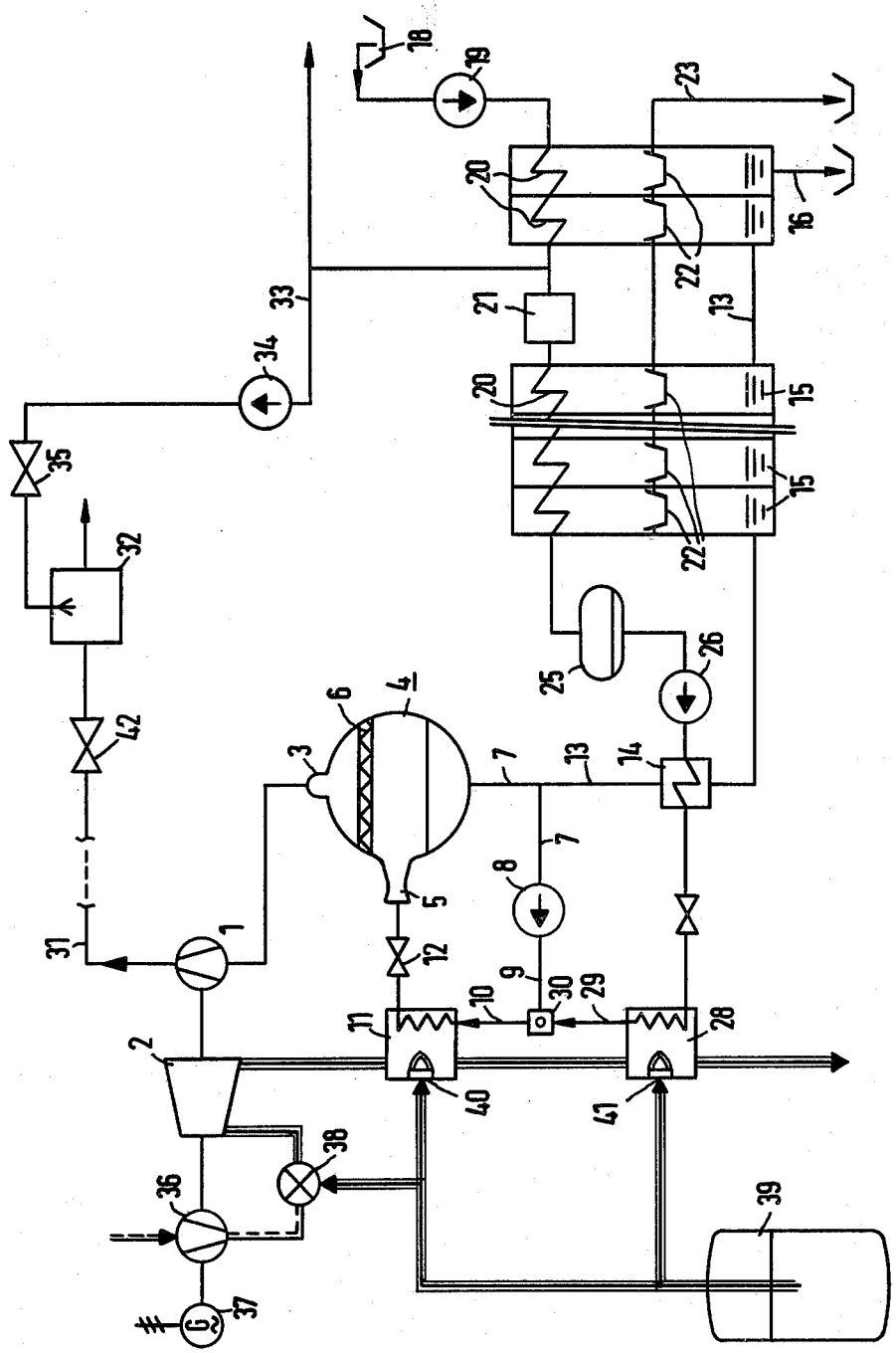

INSTALLATION FOR GENERATING SUPERHEATED PROCESS STEAM FROM SALT-CONTAINING RAW WATER

This application is a continuation of application Ser. No. 265,627 filed May 20, 1981.

BACKGROUND OF THE INVENTION

1. Field of the Invention

The invention relates to an installation for generating superheated process steam from salt-containing raw water, using preheaters for heating the raw water.

2. Description of the Prior Art

For generating superheated steam for steam turbine installations there is employed, as a rule, a high-pressure steam generator (German Published Non-Prosecuted Application 22 43 380) in which a closed water-steam circuit is provided. In this water-steam circuit, high-quality feedwater is used which is kept free of salt and other impurities by processing and filter equipment. Contrary thereto, in chemical operations for coal gasification, in raw-oil pumping or in the processing of oil sand or oil shale, process steam is required which is not fed back into the installation. This means that, for generating superheated process steam for such purposes, large quantities of feedwater must be processed and desalinated, because otherwise salt deposits must be expected, particularly in the evaporation zone, which degrade the heat transfer and cause corrosion of the evaporator tubes.

SUMMARY OF THE INVENTION

An object of the present invention is to provide an arrangement in which salt-containing water can be converted into superheated steam without the formation of salt deposits.

With the foregoing and other objects in view, there is provided in accordance with the invention an apparatus for generating superheated process steam from raw water containing salt, using preheaters for heating, comprising preheaters to impart sufficient heat to raw water containing salt flowing therethrough to permit subsequent evaporation of said water, a decompression chamber for collecting a body of unevaporated water and salt above which is a vapor space containing steam connected to said last preheater in the flow direction of the raw water flowing through the preheaters, a control valve interposed in the flow of raw water between said last preheater and said decompression chamber to regulate the flow of raw water to the decompression chamber, said water partially evaporating with the unevaporated water and salt collecting as said body in the decompression chamber and the evaporated water collecting in said vapor space above said body, and a compressor with its suction side connected to the vapor space of the decompression chamber for withdrawal of steam therefrom and compression and heating of the withdrawn steam.

Other features which are considered as characteristic for the invention are set forth in the appended claims.

Although the invention is illustrated and described herein as embodied in an installation for generating superheated process steam from salt-containing raw water, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically illustrated apparatus for carrying out the invention. The principal components and their relationship as seen from the drawing, are preheaters for heating raw water containing salts, followed by a control valve and then a decompression chamber. Water and salt separate from steam resulting from vaporization of part of the raw water. A steam compressor withdraws steam from the decompression chamber, compresses and heats the steam, and discharges the compressed heated steam through a transport line to the site of steam consumption. A gas turbine for driving the compressor may be coupled to a generator. Unevaporated raw water containing salt discharged from the decompression chamber is subjected to stepwise reduction in pressure to vaporize part of the water and condense and recover the condensate as well as treating incoming raw water and cooling the unevaporated water.

DETAILED DESCRIPTION OF THE INVENTION

In accordance with the invention, the last preheater, as seen in the flow direction of the raw water, is followed via a control valve by a decompression cylinder. The preheaters are designed to impart sufficient heat so that part of the raw water fed-in by the control valve is evaporated in the decompression cylinder; and that the part of the decompression cylinder filled with steam is followed by a steam compressor for superheating and compressing the steam.

An embodiment example is shown in the drawing. Here, a steam compressor which is driven by a gas turbine 2 is provided for superheating the steam. The steam compressor 1 draws vapor from the dome 3 of a decompression cylinder 4, into which heated, salt-containing raw water is fed through an expansion nozzle 5. Through the decompression of the water in the expansion nozzle 5, part of the fed-in raw water evaporates in the decompression cylinder 4, while the rest of the fed-in raw water and the salts contained in the raw water accumulate at the bottom of the decompression cylinder 4. A separator 6 which separates the dome 3 from the remaining content of the decompression cylinder 4 is arranged inside the decompression cylinder 4 to remove drops entrained in the uprising steam. The salt-containing water accumulating at the bottom of the decompression cylinder 4 is withdrawn through drain line 7 and a major part forced by pump 8 through lines 9 and 10, into preheater 11. There, the water is heated to near the boiling point at high pressure and then flows via control valve 12 to the expansion nozzle 5.

Part of the unevaporated water and salt leaving the decompression cylinder 4 through the line 7 flows via a blow-down line 13 and heat exchanger 14 inserted in line 13, to the condensers 15 where the water is further decompressed in steps until it leaves the installation via line 16 through which it is directed to a blow-down tank.

Water which is taken from a supply tank 18 and is brought to an intermediate pressure by a pump 19 serves to cool the individual condensers 15. The water from pump 19 flows through heat exchanging tubes 20, which are arranged in the individual condensers 15 as well as through a water softener 21 arranged between the condensers 15 in the line of the heat exchanging tubes 20. Part of the water pumped by the pump 19 is branched off ahead of the water softener 21 and is returned to the outside. Below the heat exchanging tubes 20, each condenser 15 contains collecting tanks 22 in which the water condensed at the heat exchanging tubes 20 is collected. The water collecting in the collecting tanks 20, i.e. the condensate then flows off to a condensate or distillate tank via a line 23.

The raw water heated in the heat exchanging tubes 20 is collected in a feed-water tank 25 and is forced from there by pump 26 through heat exchanger 14 and preheater 28 with a control valve interposed between them. Exhaust gas from gas turbine 2 heats prehater 11. Preheater 28 is heated by the exhaust gas of the gas turbine 2, which leaves the preheater 11. The preheated salt-containing raw water from preheater 28, flows through line 29; is mixed with the water from the line 9 at the feed-point 30 and the mixture then flows through line 10, preheater 11, control valve 12, nozzle 5 into the preheater 11.

The steam compressor 1 compresses and superheats the saturated steam drawn from the dome 3 of the decompression cylinder 4, without the need for hot, heat-exchanging surfaces for steam superheating, such as, for instance, in a superheater in a steam power generating station. The superheated and compressed steam then passes into a transport line 31, through which it is conducted to the site of the steam consumption. In case superheated steam is not required but only saturated steam is needed there, which latter is normally difficult to transport in a longer transport pipe, an injection cooler 32 with a throttling valve 42 is provided at the location of the consumption. Injection water from a line 33, branched off ahead of the softener 21, is forced by pump 34 through control valve 35 inserted in line 33 into injection cooler 32. Saturated steam is discharged from injection cooler 32.

The gas turbine 2 is coupled to the steam compressor 1, and in addition to a compressor 36 and a generator 37 which can provide, for instance, the electric power for the entire installation. The combustion chamber 38 inserted between the compressor 36 and the gas turbine 2 is supplied from a tank 39 with fuel (gas, oil, etc.) This tank 39 may also be connected to burners 40 and 41 by means of which the preheaters 11 and 28 may be heated.

We claim:
1. Apparatus for generating superheated process steam from raw water containing salt, using preheaters for heating comprising
   (a) preheaters to impart sufficient heat to raw water containing salt flowing therethrough under pressure to permit subsequent evaporation of said water,
   (b) a decompression chamber for collecting a body of unevaporated water and salt above which is a vapor space containing steam, said decompression chamber being free of cooling means to condense the steam therein and at a lower pressure than the raw water containing salt flowing through the preheaters to promote evaporation of water from the raw water
   (c) said decompression chamber connected to said last preheater in the flow direction of the raw water flowing through the preheaters,
   (d) a control interposed in the flow of raw water between said last preheater and said decompression chamber to regulate the flow of raw water to the decompression chamber, said water partially evaporating with the unevaporated water and salt collecting as said body in the decompression chamber and the evaporated water collecting in said vapor space above said body,
   (e) a compressor with its suction side connected to the vapor space of the decompression chamber for withdrawal of steam therefrom and compression and heating of the withdrawn steam to produce superheated steam,
   (f) a gas turbine coupled to the steam compressor,
   (g) conduit means to flow hot exhaust gases from said gas turbine to said preheaters, the heat of the hot exhaust gases heating the raw water in the preheaters,
   (h) a generator also coupled to said gas turbine for generating electricity,
   (i) a blow-down line connected to the decompression chamber for passage therefrom of the unvaporized raw water containing salt, and
   (j) a heat exchanger inserted into the blow-down line for preheating the flowing stream of raw water before the raw water is further heated by said hot exhaust gases.

2. Apparatus according to claim 1, wherein the preheaters are provided with burners to which fuel and air are fed to generate hot combustion gases which heat the preheaters.

3. Apparatus according to claim 1, wherein a transport line for transporting the superheated steam is connected from the steam compressor to an injection cooler at the site of use of the steam for generating saturated steam.

4. Apparatus according to claim 1, wherein condensers are connected to the blow-down line which conducts the heated unvaporized raw water into and out of said condensers cooled by raw water passing through cooling tubes with stepwise reduced pressure to effect evaporation of part of the unvaporized raw water and condensation of such vapor, and wherein the condensers have collecting tanks for the condensate forming at the cooling tubes.

* * * * *